US 6,554,617 B1

(12) United States Patent
Dolan

(10) Patent No.: US 6,554,617 B1
(45) Date of Patent: Apr. 29, 2003

(54) VOCABULARY TEACHING AID SYSTEM AND METHOD

(76) Inventor: F. J. "Steve" Dolan, P.O. Box 65463, St. Paul, MN (US) 55165

( * ) Notice: Subject to any disclaimer, the term of this patent is extended or adjusted under 35 U.S.C. 154(b) by 0 days.

(21) Appl. No.: 09/543,632

(22) Filed: Apr. 5, 2000

Related U.S. Application Data

(60) Provisional application No. 60/127,857, filed on Apr. 5, 1999.

(51) Int. Cl.[7] .................................................. G09B 5/02
(52) U.S. Cl. ....................... 434/169; 434/362; 434/323
(58) Field of Search ................................. 434/156, 167, 434/169, 323, 362

(56) References Cited

U.S. PATENT DOCUMENTS 5,827,071 A * 10/1998 Sorensen et al. ........... 434/323
5,980,264 A * 11/1999 Lundberg .................... 434/322
6,086,382 A * 7/2000 Thomas ....................... 434/323

* cited by examiner

Primary Examiner—Kien T. Nguyen
(74) Attorney, Agent, or Firm—Patterson, Thuente, Skaar & Christensen, P.A.

(57) ABSTRACT

A vocabulary teaching aid system generally includes a computer that is operably connected to a video monitor and one or more user-interactive peripherals, e.g., keyboard or mouse. The computer operates under direction of a program whose directions include providing an interactive screen presentation on the video monitor, providing for selection of a desired vocabulary word from the screen presentation through use of the user-interactive peripheral, and presenting an example of usage of the selected vocabulary word on the video monitor.

10 Claims, 4 Drawing Sheets

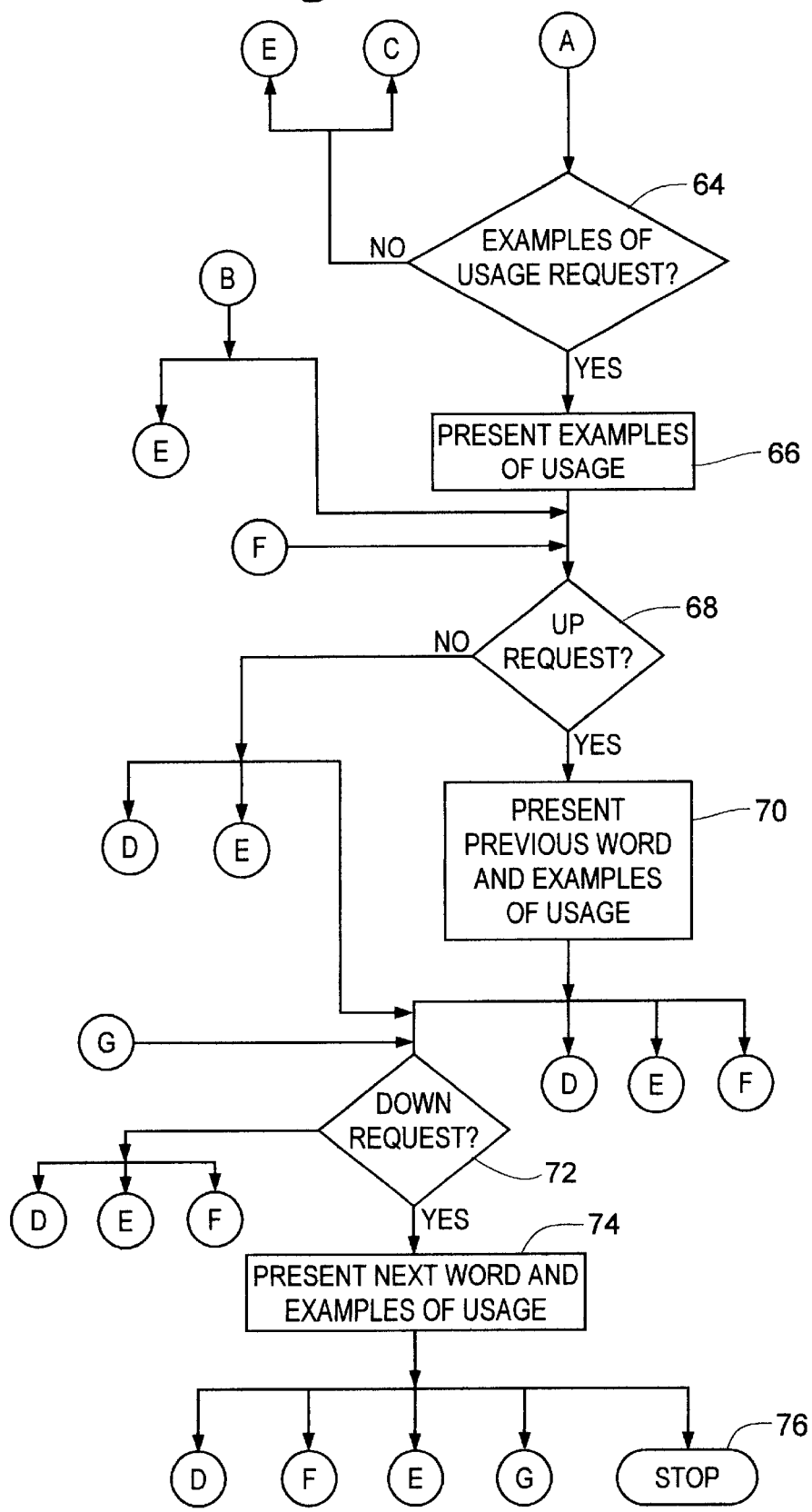
Fig. 2 (con.'t)

VOCABULARY TEACHING AID SYSTEM AND METHOD

This application claims the benefit of Provisional application No. 60/127,857, filed Apr. 5, 1999.

FIELD OF THE INVENTION

The present invention relates to teaching aids and, more particularly, to a teaching aid that may be used to enhance understanding of vocabulary words.

BACKGROUND OF THE INVENTION

As an adult, a broad vocabulary allows one to express oneself eloquently and succinctly, as well as understand those around you. However, often, one's vocabulary is limited due to lack of education, economic stature, the geographic area in which one lives, and/or simply forgetfulness. As a child, it is important to be provided with the appropriate tools so that the learning and the ultimate possession of a broad vocabulary can occur.

As such, there is a need to provide a tool that may be easily used by both adult and child to enhance or expand their knowledge of vocabulary words. To be most effective, it is important that the tool provide numerous vocabulary words and examples of usage of those vocabulary words. Further effectiveness can be provided by incorporating definitions and/or synonyms of the vocabulary words into the tool.

SUMMARY OF THE INVENTION

The needs described above are in large measure met by the vocabulary teaching aid system of the present invention. The vocabulary teaching aid system generally includes a computer that is operably connected to a video monitor and one or more user-interactive peripherals, e.g., keyboard or mouse. The computer operates under direction of a program whose directions include providing an interactive screen presentation on the video monitor, providing for selection of a desired vocabulary word from the screen presentation through use of the user-interactive peripheral, and presenting an example of usage of the selected vocabulary word on the video monitor.

The example of usage is generally a complete sentence utilizing the selected vocabulary word. The example of usage additionally includes a meaning of the selected vocabulary word that is punctuated within the complete sentence. The punctuated meaning preferably occurs immediately after the vocabulary word within the sentence. The program may provide additional directions to the computer including presenting a synonym of the selected vocabulary word as well as allowing selection of the vocabulary by providing a list of pre-determined vocabulary words and/or allowing typed entry of the desired vocabulary word.

A method for expanding knowledge of vocabulary of the present invention generally includes the steps of providing an interactive screen presentation, allowing for selection of a desired vocabulary word from the interactive screen presentation, and providing an example of usage of the selected vocabulary word.

DESCRIPTION OF THE PREFERRED EMBODIMENTS

A vocabulary teaching aid system 10 of the present invention is a software tool that may be used by teachers, students, children, and adults alike to enhance their understanding and ability to use vocabulary words of which they are already aware as well as learn new vocabulary words and their proper usage.

Figure 1:
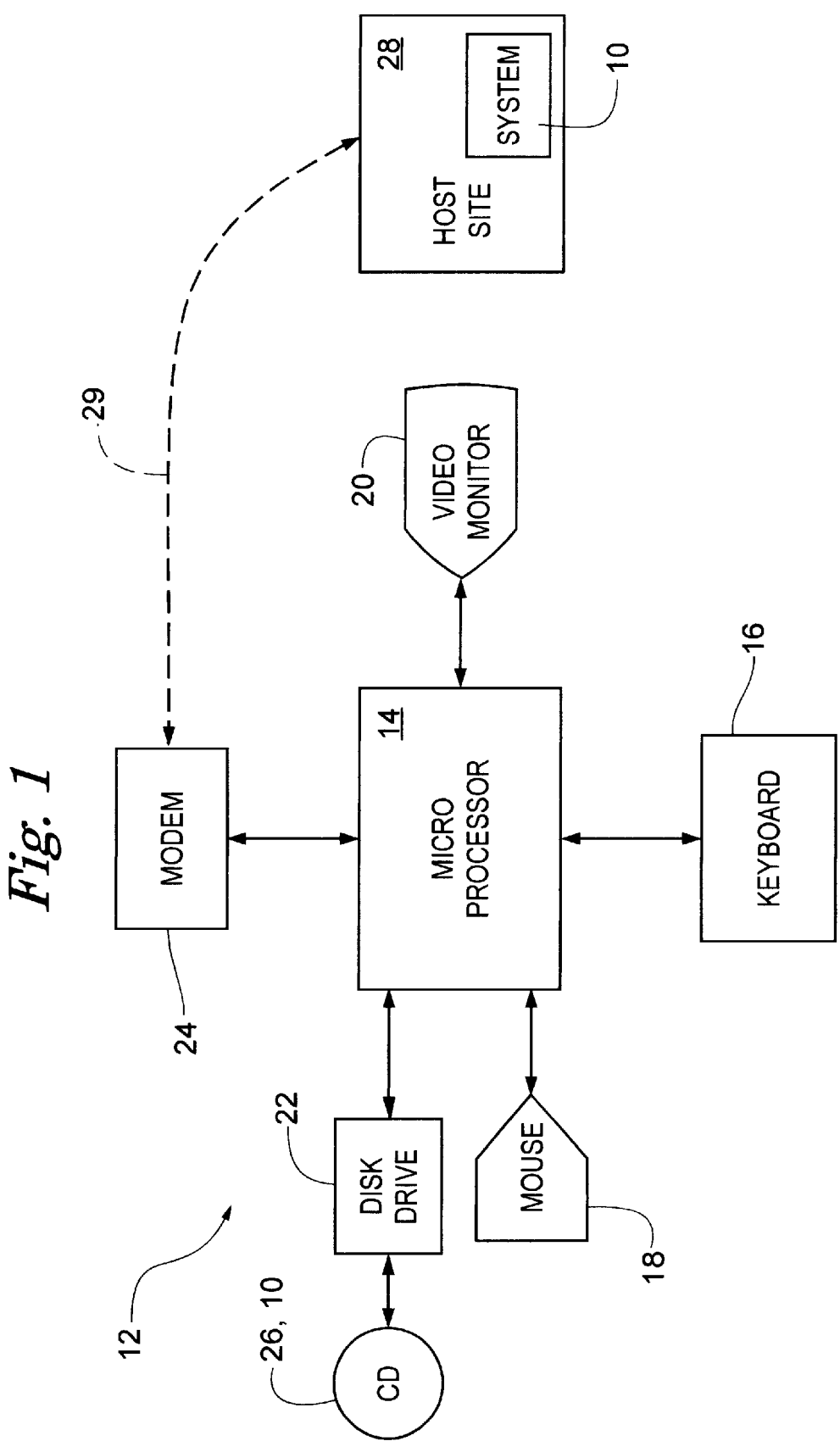
FIG. 1 provides an example of a system in which a vocabulary teaching aid of the present invention is preferably implemented.

Referring to FIG. 1, an example computer system 12 on which vocabulary teaching aid system 10 may be implemented is shown. Computer system 12 incorporates a microprocessor 14 that is operably connected to various peripherals including a keyboard 16, mouse 18, video monitor 20, a disk drive 22, e.g., a floppy disk drive or a compact disc drive, and modem 24. Of course, additional or fewer peripherals may be utilized with computer system 12 without departing from the spirit or scope of the invention. Vocabulary teaching aid system 10 is preferably contained on a compact disc 26 that is readable by disk drive 22. Alternatively, vocabulary teaching aid system 10 may be stored at a host site 28 whereby it is downloadable to a user's computer system 12 via the Internet and modem 24.

Figure 2:
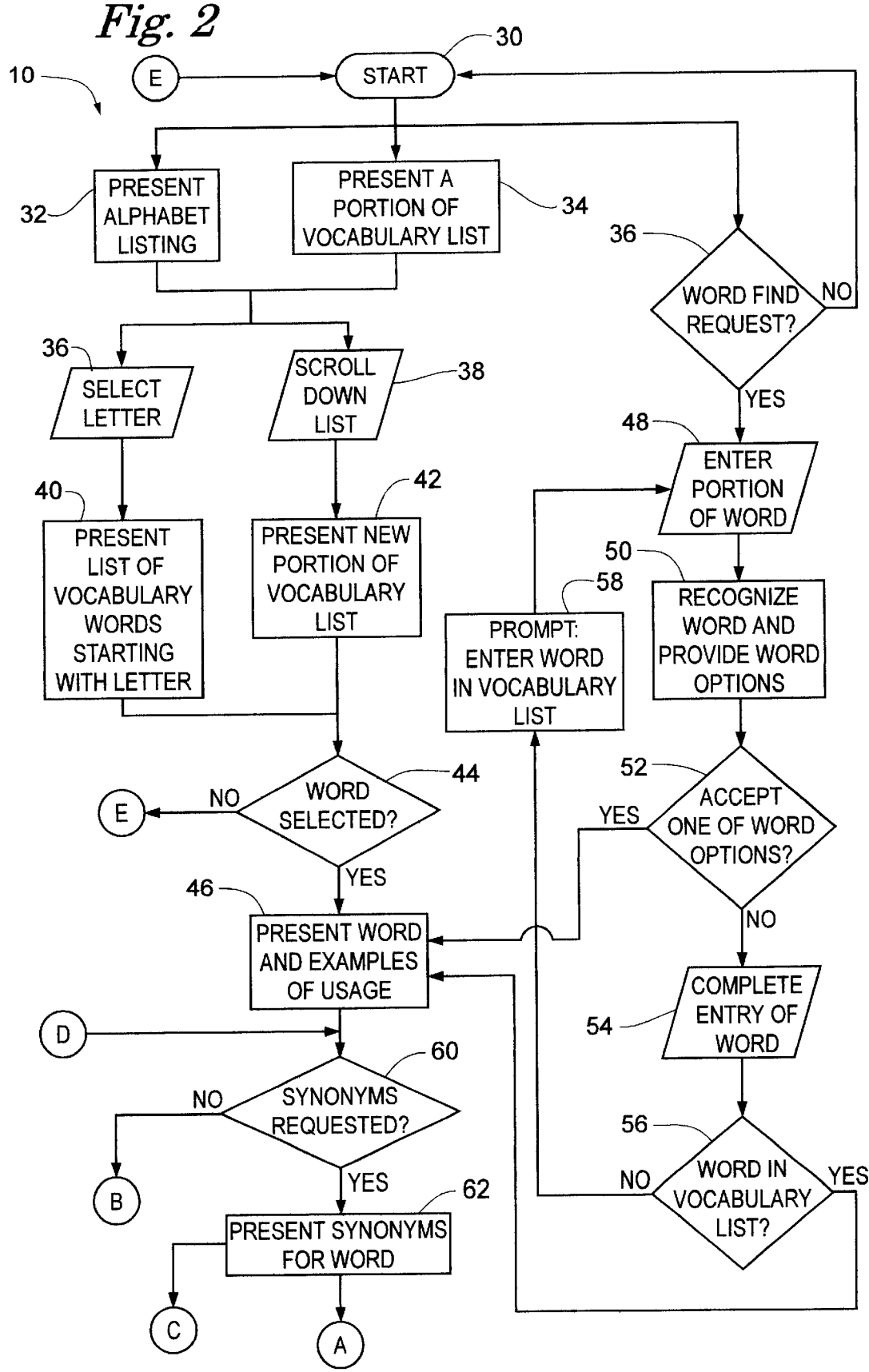
FIG. 2 provides a flowchart of the operation of the vocabulary teaching aid.

FIG. 2 provides a flowchart depicting the operation of vocabulary teaching aid system 10. However, it should be noted that while the flowchart of FIG. 2 and its accompanying description provide for one possible operation of the software of vocabulary teaching aid system 10, the numerous functions of vocabulary teaching aid system 10 may be performed in any appropriate order, including simultaneous performance of two or more functions without departing from the spirit or scope of the invention.

As FIG. 2 shows, upon installation and start-up 30 of vocabulary teaching aid system 10, the user is presented with a listing of the alphabet, operations block 32, with a listing of a portion of a vocabulary list, operations block 34, and with the option of entering a vocabulary word of their choice, as indicated by decision block 36. With the alphabet and a portion of the vocabulary word list presented, the user has the option of selecting a letter of the alphabet, input block 38, through use of keyboard 16 or mouse 18, or of scrolling through the vocabulary word list, input block 38, through use of keyboard 16 or mouse 18.

If the user chooses the option of selecting a letter of the alphabet, the user is presented with a portion of the vocabulary word list wherein the words presented begin with the selected letter of the alphabet, operations block 40. If the user chooses the option of scrolling through the vocabulary word list, the user is presented with a scrolling presentation of the vocabulary word list in alphabetical order, operations block 42.

With a portion of the vocabulary word list before them, the user may select one of the vocabulary words, through use of keyboard 16 or mouse 18, as indicated by decision block 44. If no vocabulary word is selected, the user is returned to the start of the program wherein the user is provided with the options of entering a vocabulary word, selecting a letter of the alphabet, or continued scrolling through the vocabulary word list. In the instance that a vocabulary word is selected, the user is presented with the word and examples of usage, i.e., a complete sentence utilizing the selected vocabulary word with the meaning/definition of the word as used in the sentence indicated within brackets, parentheses or otherwise punctuated, per operations block 46. At least one example of usage is provided for each vocabulary word. However, if a vocabulary word has more than one meaning or definition, an example of usage is preferably provided for each meaning/definition.

If the user has chosen to enter a vocabulary word of their choice, as described above, they are prompted to type in the word, input block 48, through use of keyboard 16. In a preferred embodiment, upon the start of entry of the word, vocabulary teaching aid system 10 recognizes the word and automatically completes the spelling/entry of the word for the user. Additionally, upon the start of entry of the word, vocabulary teaching aid system 10 recognizes the letters entered thus far and provides a listing of words within the vocabulary word list that start with the entered letters, see operations block 50. The user may choose to accept the now completed spelling of the word, one of the listed words, or may decline those provided by vocabulary teaching aid system 10, per decision block 52. If the user does accept the now completed spelling or a listed word, the user is presented with the word and examples of usage, per operations block 46, as described in the paragraph above.

If the user declines those words provided by vocabulary teaching aid system 10, the user may continue the spelling or entry of the word to completion, input block 54. Vocabulary teaching aid system 10 then operates to verify that the user-entered word is indeed a word within the vocabulary word listing, per decision block 56. If the user-entered word is not a word within the vocabulary word listing, the user is notified that they must enter a word within the vocabulary word listing, operations block 58, and is then prompted to enter another word, per input block 48. If the user-entered word is a word within the vocabulary word listing, the user is presented with the word and examples of usage, per operations block 46.

Vocabulary teaching aid system 10 provides the user with the option of requesting synonyms for the selected word within the vocabulary word list, per decision block 60. If synonyms are requested, vocabulary teaching aid system 10 presents a listing of synonyms to the user, operations block 62. The user may then request that the examples of usage for the selected word be displayed once again per decision block 64. If the user does enter such a request, vocabulary teaching aid system 10 presents the listing of examples of usage to the user, operations block 66. If the user does not enter such a request, the user may then be returned to the start of the program wherein the user is provided with the options of entering a vocabulary word, selecting a letter of the alphabet, or continued scrolling through the vocabulary word list, or may stay with the list of synonyms, operations block 62. If no synonyms are requested, the user may then be returned to the start of the program or utilize other options of vocabulary teaching aid system 10 as described below.

Vocabulary teaching aid system 10 also preferably provides the user with an "up" option and a "down" option. If the user makes an "up" request, per decision block 68, the user is presented with the word within the vocabulary word list, along with its examples of usage, that is immediately, alphabetically prior to the word that had just previously been selected, operations block 70. If the user does not make an "up" request the user may request synonyms, per decision block 60, for the selected word at hand, or may return to the start of the program wherein the user is provided with the options of entering a vocabulary word, selecting a letter of the alphabet, or continued scrolling through the vocabulary word list.

If the user makes a "down" request, per decision block 72, the user is presented with the word within the vocabulary word list, along with its examples of usage, that is immediately, alphabetically subsequent to the word that had just previously been selected, operations block 74. If the user does not make a "down" request the user may request synonyms, per decision block 60, for the selected word at hand, make an "up" request, per decision block 68, or may return to the start of the program wherein the user is provided with the option of entering a vocabulary word, selecting a letter of the alphabet, or continued scrolling through the vocabulary word list.

After making a "down" request, the user may request synonyms, per decision block 60, for the selected word at hand, make an "up" request, per decision block 68, make another "down" request, per decision block 72, may return to the start of the program wherein the user is provided with the options of entering a vocabulary word, selecting a letter of the alphabet, or continued scrolling through the vocabulary word list, or may stop the program, block 76.

Figure 3:
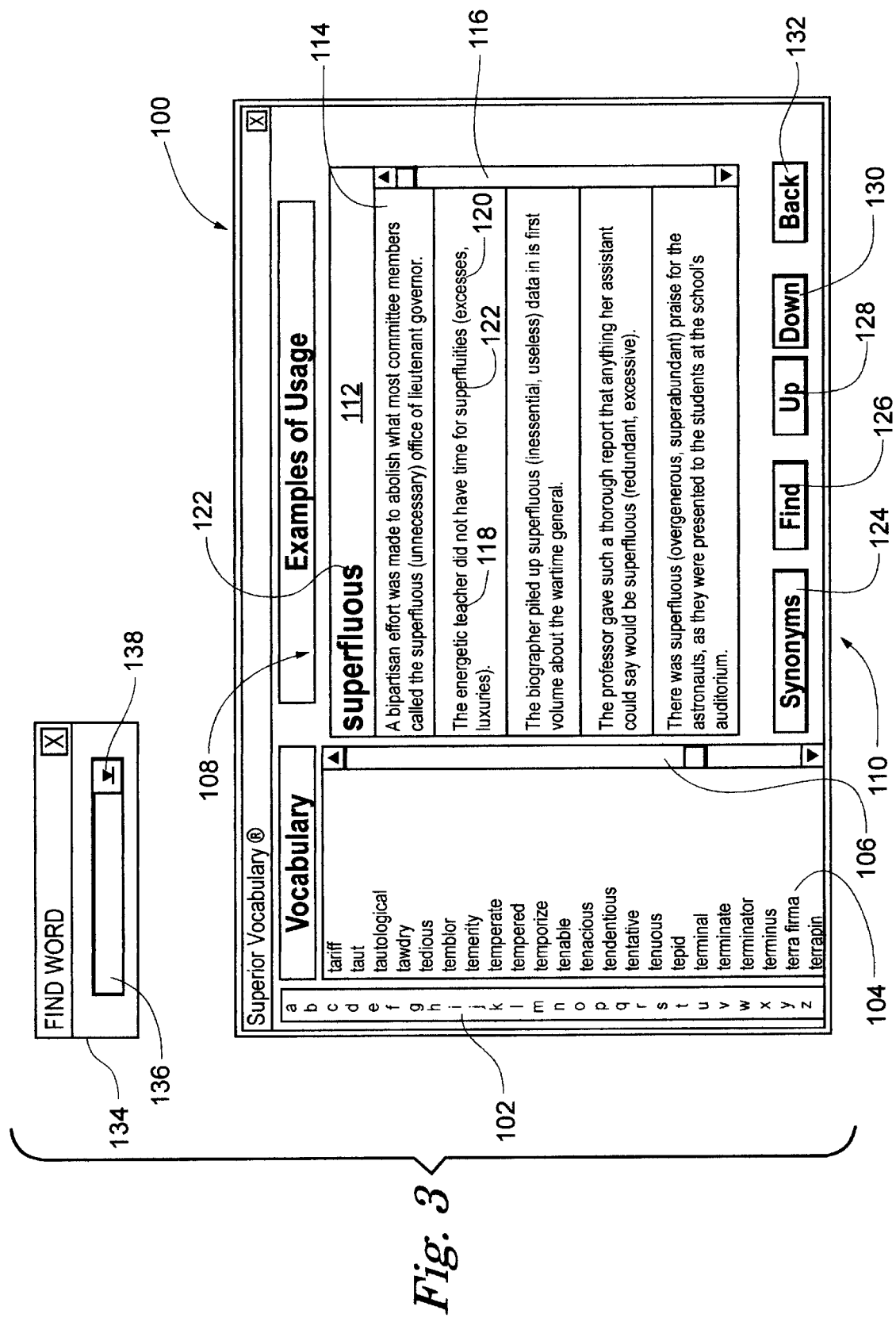
FIG. 3 depicts an example of a viewable screen of the vocabulary teaching aid.

Referring to FIG. 3, a preferred interactive screen presentation 100 of vocabulary teaching aid system 10 as a user would view on video monitor 20 is provided. Screen presentation 100, moving from left to right, preferably includes an alphabet listing 102, a listing 104 in alphabetical order of a portion of the vocabulary word list, a scroll bar 106, examples of usage section 108, and option buttons 110. Additional elements may be incorporated into screen presentation 100 without departing from the spirit or scope of the invention.

Alphabet listing 102 provides a listing of letters from which the user may select. Listing 104 provides a listing of a portion of the vocabulary word list; the portion may be altered by selecting a new letter from listing 102 or repositioning scroll bar 106. Examples of usage section 108 preferably includes a selected word display portion 112 and a multiple-row sentence display portion 114. If the number of examples of usage exceeds multiple-row sentence display portion 114, a scroll bar 116 is preferably provided to allow the user to scroll through the additional examples of usage. At least one of the multiple-row sentence display portions 114 is provided with a complete sentence 118 that incorporates, via parentheses, brackets, or other manner of punctuating, the meaning/definition 120 of the vocabulary word 122. This meaning/definition preferably appears immediately after vocabulary word 122 within sentence 118.

Option buttons 110 of screen presentation 100 preferably include a "Synonyms" button 124, a "Find" button 126, an "Up" button 128, and a "Down" button 130. A "Back" button 132 may also be provided. Activation of "Synonyms" button 124 produces a synonyms listing (not shown) for vocabulary word 122 within multiple-row sentence display portion 114. While the synonyms are displayed the examples of usage are hidden. Further, upon activation of "Synonyms" button 124, button 124 is transformed into an "Examples of Usage" button (not shown) allowing the user to switch back and forth between the synonyms and examples of usage for vocabulary word 122.

Activation of "Find" button 126 preferably produces a pop-up window 134 within screen presentation 100. For clarity, pop-up window 134 is provided to the side of screen presentation 100 in FIG. 3. Pop-up window 134 includes a blank line 136 for entry of a desired vocabulary word and also provides for a down arrow 138, which when selected presents a listing of words. Pop-up window 134 disappears from screen presentation 100 upon the entry or selection of a vocabulary word.

Activation of "Up" button 128, causes the presentation of a new vocabulary word 122 and its examples of usage within selected word display portion 112 and multiple-row sentence display portion 114, as does the activation of "Down" button 130. In the instance of activation of "Up" button 128, the vocabulary word presented is that word immediately, alphabetically prior to the word that had just previously been selected and in the instance of activation of "Down" button 130, the vocabulary word presented is that word immediately, alphabetically subsequent to the word that had just previously been selected. The implementation of "Back" button 132 allows the user to return to the previously viewed screen.

In view of the above, the user, whether teacher, student, child or adult, through use of vocabulary teaching aid system 10 of the present invention, is provided with an interactive learning tool that is not only easy to use but is, as well, able to enhance learning by providing examples of usage for a vocabulary word as well as an incorporated meaning/definition of the vocabulary word.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A vocabulary teaching aid system, comprising:

a programmable apparatus;

a video monitor operably coupled to said programmable apparatus;

an user-interactive peripheral operably coupled to said programmable apparatus; and a program, wherein said program directs the operations of said programmable apparatus to:

provide an interactive screen presentation on said video monitor;

provide for selection of a vocabulary word from said interactive screen presentation through use of said interactive peripheral; and present an example of usage of the selected vocabulary word on said video monitor wherein said example of usage is a complete sentence utilizing said vocabulary word and wherein said program directs the operations of said programmable apparatus to present a synonym of said selected vocabulary word on said video monitor in the complete sentence.

2. The system of claim 1, wherein said example of usage includes the meaning of said vocabulary word and wherein said meaning is punctuated within said example of usage.

3. The system of claim 2, wherein the punctuated meaning of said vocabulary word occurs immediately after said vocabulary word within said complete sentence.

4. The system of claim 1, wherein said program directs the operations of said programmable apparatus to provide for selection of said vocabulary word by providing a list of vocabulary words to select from.

5. The system of claim 1, wherein said program directs the operations of said programmable apparatus to provide for selection of said vocabulary word by providing for a typed entry of said vocabulary word.

6. A method for expanding knowledge of vocabulary, comprising the steps of:

providing an interactive screen presentation on a video monitor;

allowing selection of a desired vocabulary word from said interactive screen presentation by means of an interactive peripheral;

providing an example of usage of the selected vocabulary word on the video monitor, wherein said example of usage is a complete sentence utilizing said vocabulary word; and providing a synonym of said selected vocabulary word in said complete sentence.

7. The system of claim 6, wherein said example of usage includes the meaning of said vocabulary word and wherein said meaning is punctuated within said example of usage.

8. The system of claim 7, wherein the punctuated meaning of said vocabulary word occurs immediately after said vocabulary word within said complete sentence.

9. The method of claim 6, wherein said step of allowing selection comprises allowing selection of a desired vocabulary word from a pre-determined list of vocabulary words.

10. The method of claim 6, wherein said step of allowing selection comprises allowing for a typed entry of a vocabulary word.

\* \* \* \* \*